United States Patent
Rieger et al.

(10) Patent No.: US 11,659,269 B2
(45) Date of Patent: May 23, 2023

(54) OPTICAL MEASURING DEVICE

(71) Applicant: Carl Zeiss Industrielle Messtechnik GmbH, Oberkochen (DE)

(72) Inventors: Stephan Rieger, Oberkochen (DE); Lionel Martz, Oberkochen (DE); Tobias Feldengut, Düsseldorf (DE); Erich Michler, Kirchheim Am Ries (DE); Kilian Neumaier, Heidenheim (DE); Markus Ritter, Heidenheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 121 days.

(21) Appl. No.: 17/192,556

(22) Filed: Mar. 4, 2021

(65) Prior Publication Data
US 2021/0281741 A1   Sep. 9, 2021

(30) Foreign Application Priority Data

Mar. 4, 2020 (EP) ..................................... 20160870

(51) Int. Cl.
*H04N 5/232* (2006.01)
*G01B 11/00* (2006.01)

(52) U.S. Cl.
CPC ....... *H04N 5/23216* (2013.01); *G01B 11/005* (2013.01); *H04N 5/23299* (2018.08)

(58) Field of Classification Search
None
See application file for complete search history.

(56) References Cited

U.S. PATENT DOCUMENTS

2011/0298901 A1   12/2011   Derrien et al.
2012/0045790 A1*   2/2012   Van Dijk .................. G01N 1/04
                                                                        382/128

(Continued)

FOREIGN PATENT DOCUMENTS

EP   1 916 499 A1   4/2008

OTHER PUBLICATIONS

Youtube clip entitled "ZEISS Smartzoom 5: Large Area Image in 90 Seconds", uploaded on Sep. 29, 2015 by ZEISS Microscopy. Retrieved from the Internet: <https://www.youtube.com/watch?v=58kXbUucG4A> (Year: 2015).*

(Continued)

*Primary Examiner* — James M Anderson, II
(74) *Attorney, Agent, or Firm* — Miller Johnson

(57) ABSTRACT

An optical measuring device includes at least one optical sensor configured for optical capture of at least one measurement object at multiple image recording positions. The optical measuring device includes at least one display device configured to display, for multiple predetermined and/or determinable image recording positions, in each case a schematic representation of an image to be recorded at the respective image recording position. The optical measuring device includes at least one data processing unit and at least one interface. The interface is configured to provide at least one item of manipulation information to the data processing unit. The data processing unit is configured to, based on the manipulation information, adapt at least one of the image recording position and an image recording parameter of at least one of the images to be recorded.

18 Claims, 2 Drawing Sheets

(56) References Cited

U.S. PATENT DOCUMENTS

2016/0061717 A1* 3/2016 Bawolek .............. G02B 21/088
356/402
2019/0364257 A1 11/2019 Wolke et al.

OTHER PUBLICATIONS

"Smartzoom 5 Smart Design. Smart Workflow. Smart Output". Retrieved from the Internet wayback machine Aug. 28, 2016 < https://web.archive.org/web/20160828113928/http://www.zeiss.com/microscopy/en_de/products/imaging-systems/smartzoom-5.html> (Year: 2016).*

* cited by examiner

OPTICAL MEASURING DEVICE

CROSS-REFERENCE TO RELATED APPLICATIONS

This application claims priority to European Patent Application No. 20 160 870.0 filed Mar. 4, 2020. The entire disclosure of the application referenced above is incorporated by reference.

FIELD

The invention relates to an optical measuring device, a device for dimensional measurement of a measurement object, a method for creating a measurement program, and a test method for determining at least one dimensional property of a measurement object. The present invention relates in particular to the field of coordinate measuring technology, in particular coordinate measuring machines for optically measuring a measurement object.

BACKGROUND

Various methods for optically measuring a measurement object are known from the prior art. An optical sensor is used in such methods. The optical sensor can be moved relative to the measurement object for the purpose of recording images of the measurement object. The movement can be controlled manually or automatically, for example.

The images of the measurement object can be recorded at different image recording positions. For example, the digital microscope Smartzoom 5 from ZEISS can visualize schematic representations of anticipated image recording positions before the actual measurement. For the setting of a region to be covered with the images that is desired by the user, the user can alter as a whole a region to be covered by the images. Image recording parameters of individual images, such as zoom, are defined as they are created, and are fixed and identical for all the images.

By way of example, for tactile sensors, an automatic test plan can be created using the CALYPSO® software from ZEISS. In CALYPSO®, for certain measurement strategies, individual probe points can be visualized and manipulated by the user. In CALYPSO®, the measurement points are manipulated directly and the measurement strategy is thus altered automatically. The manipulation of each individual measurement point is possible moreover only with the use of a measurement strategy consisting of individual probe probes; this is not possible with the use of, for example, a circular path or a polyline. Only certain support points can be manipulated here.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is therefore an object of the present invention to provide an optical measuring device, a device for dimensional measurement of a measurement object, a method for creating a measurement program and a test method which at least largely avoid the disadvantages of known devices and methods. In particular, user-adaptable and thereby improved image recording is intended to be made possible.

This object is achieved by means of a device and a method having the features of the independent patent claims. Preferred configurations, which can be realized individually or in combination, are presented in the dependent claims.

Hereinafter the terms "exhibit," "have," "comprise" or "include" or any grammatical deviations therefrom are used in a non-exclusive way. Accordingly these terms can refer either to situations in which, besides the features introduced by these terms, no further features are present, or to situations in which one or more further features are present. For example, the expression "A exhibits B," "A has B," "A comprises B" or "A includes B" can refer both to the situation in which no further element aside from B is provided in A (that is to say to a situation in which A consists exclusively of B) and to the situation in which, in addition to B, one or more further elements are provided in A, for example element C, elements C and D, or even further elements.

Furthermore, it is pointed out that the terms "at least one" and "one or more" and grammatical modifications of these terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably," "in particular," "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by a person skilled in the art, can also be carried out using other configurations. Similarly, features introduced by "in one embodiment of the invention" or by "in one example embodiment of the invention" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by the introductory expressions.

The phrase at least one of A, B, and C should be construed to mean a logical (A OR B OR C), using a non-exclusive logical OR, and should not be construed to mean "at least one of A, at least one of B, and at least one of C."

In a first aspect of the present invention, an optical measuring device is proposed.

The optical measuring device comprises: at least one optical sensor configured for optical capture of at least one measurement object at a plurality of image recording positions; at least one display device configured to display for a plurality of predetermined and/or determinable image recording positions in each case a schematic representation of an image to be recorded at the respective image recording position; at least one data processing unit and at least one interface, wherein the interface is configured to provide at least one item of manipulation information to the data processing unit, wherein the data processing unit is configured to adapt the image recording position and/or at least one image recording parameter of at least one of the images to be recorded depending on the manipulation information.

The term "optical measuring device" as used here is a broad term which is intended to be accorded its customary and familiar meaning as understood by a person skilled in the art. The term is not restricted to a specific or adapted meaning. The term can refer, without restriction, in particular to any device comprising at least one optical sensor system, in particular at least one optical sensor.

The term "optical sensor" as used here is a broad term which is intended to be accorded its customary and familiar meaning as understood by a person skilled in the art. The term is not restricted to a specific or adapted meaning. The term can refer, without restriction, in particular to a sensor configured to generate an imaging, also called image, of a measurement object. The optical sensor can be a two- or three-dimensional optical sensor. By way of example, the three-dimensional optical sensor could comprise at least one time-of-flight sensor (ToF). By way of example, the optical sensor can be a two-dimensional image sensor. The optical sensor can comprise at least one camera sensor, for example at least one CCD camera. The optical sensor is configured for optical capture of at least one measurement object. The term "optical capture" as used here is a broad term which is intended to be accorded its customary and familiar meaning as understood by a person skilled in the art. The term is not restricted to a specific or adapted meaning. The term can refer, without restriction, in particular to recording an image of the measurement object or of a part of the measurement object. An "image" can be understood to mean an imaging of the measurement object that is captured by the optical sensor.

The optical measuring device can comprise at least one evaluation unit configured to evaluate the recorded image. The evaluation can comprise determining a position of at least one measurement point relative to a reference coordinate system. The evaluation unit can comprise at least one data processing unit, for example at least one computer or microcontroller. The data processing unit can have one or more volatile and/or non-volatile data memories, wherein the data processing unit can be configured for example in terms of programming to evaluate the image. The evaluation unit can furthermore comprise at least one interface, for example an electronic interface and/or a human-machine interface such as, for example, an input/output device such as a display and/or a keyboard. By way of example, one or more electronic connections between the optical sensor and the evaluation unit can be provided.

The term "image recording position" as used here is a broad term which is intended to be accorded its customary and familiar meaning as understood by a person skilled in the art. The term is not restricted to a specific or adapted meaning. The term can refer, without restriction, in particular to a position of the optical sensor at the time of image recording. The position can comprise a spatial position, in particular a three-dimensional point (x, y, z) in a coordinate system, and/or an orientation of the optical sensor. The orientation can be specified by at least three angles, for example an Euler angle or inclination angle, a roll angle and a yaw angle.

The term "image recording parameter" as used here is a broad term which is intended to be accorded its customary and familiar meaning as understood by a person skilled in the art. The term is not restricted to a specific or adapted meaning. The term can refer, without restriction, in particular to an arbitrary property and/or a feature of the image and/or a setting of the optical sensor and/or of a further component of the optical measuring device, such as a lens. The image recording parameter can comprise at least one parameter selected from the group consisting of: size, scaling, translation, rotation, torsion. Such parameters can be determined by settings of the optical sensor and/or of a further component of the optical measuring device, such as a lens, for example a zoom setting. The image recording parameter can comprise at least one parameter of at least one setting such as an illumination control, for example of a bright field, dark field, transmitted-light and/or coaxial illumination, and/or of a camera such as, for example, exposure time and/or aperture setting. The image recording parameters can also comprise settings of further constituent parts, connected to a control unit, for example of the coordinate measuring machine, such as, for example, an illumination control, for example bright field, dark field, transmitted-light and/or coaxial illumination, and camera parameters such as, for example, exposure time and aperture setting.

The term "measurement object" as used here is a broad term which is intended to be accorded its customary and familiar meaning as understood by a person skilled in the art. The term is not restricted to a specific or adapted meaning. The term can refer, without restriction, in particular to an arbitrarily shaped object to be measured. By way of example, the measurement object can be selected from the group consisting of a test object, a workpiece, and a component to be measured. By way of example, the measurement object can be a planar measurement object, for example having an extensive surface.

The optical measuring device can be configured to determine and/or to check at least one test feature of the measurement object. The term "test feature" as used here is a broad term which is intended to be accorded its customary and familiar meaning as understood by a person skilled in the art. The term is not restricted to a specific or adapted meaning. The term can refer, without restriction, in particular to a feature that is to be determined and/or to be checked and/or to be tested of at least one measurement element. Determining and/or checking can comprise determining and/or checking dimensional deviations and/or shape deviations and/or positional deviations. The test feature can be a feature selected from the group consisting of: at least one length; at least one angular dimension, at least one surface parameter, a shape, a position. The term "measurement element" as used here is a broad term which is intended to be accorded its customary and familiar meaning as understood by a person skilled in the art. The term is not restricted to a specific or adapted meaning. The term can refer, without restriction, in particular to a predetermined or predeterminable geometric element. The measurement element can be for example a geometric element selected from the group consisting of a circle, a cylinder, a rectangle, a straight line or another element with a regular geometry. The test feature can be determined and/or checked for example by measuring points and/or lines and/or areas of the measurement object. The optical measuring device can be configured to record a plurality of images at different image recording positions for the purpose of determining and/or checking the test feature. The recorded images can be evaluated by the evaluation unit and in each case at least one measurement point can be determined.

The test feature can be determined and/or checked using a measurement strategy. The term "measurement strategy" as used here is a broad term which is intended to be accorded its customary and familiar meaning as understood by a person skilled in the art. The term is not restricted to a specific or adapted meaning. The term can refer, without restriction, in particular to an instruction for achieving a measurement task. The measurement strategy comprises at least one capture strategy which determines the image recording, in particular image recording positions.

The measurement strategy can be defined by a user of the optical measuring device. The measurement strategy can be determinable via the interface of the optical measuring device. By way of example, the interface can be a human-machine interface and the measurement strategy can be determined via the human-machine interface. Prior to the measurement the user can determine a measurement element, for example by selecting a measurement element from a database, and define the measurement strategy.

The optical measuring device can be configured to determine the image recording positions depending on the measurement strategy. The image recording position can be an image recording position that is preprogramed for a chosen measurement strategy. The optical measuring device, in particular the data processing unit or a further processor of the optical measuring device, can be configured to execute an algorithm for determining the image recording positions in order to be able to implement the chosen measurement strategy. Alternatively, the optical measuring device can be configured to the effect that the user himself/herself can choose the image recording positions. The image recording positions can be able to be input via the interface. "Predetermined and/or determinable image recording positions" can be understood to mean image recording positions determined by the algorithm or image recording positions input by the user.

A relative position of the optical sensor and of the measurement object can be adjustable. By way of example, a multiplicity of relative positions of the optical sensor and of the measurement object can be adjustable for the purpose of recording the plurality of measurement points. By way of example, the optical sensor can be moveable, for example in at least three spatial directions. By way of example, the optical sensor can be displaceable and the measurement object can lie on a fixed or moveable support. Embodiments with a fixed optical sensor are also conceivable, wherein the measurement object can then be displaced in these embodiments.

A relative movement of optical sensor and measurement object can be controlled by an apparatus controller of the optical measuring device and/or an external apparatus controller. The relative movement of optical sensor and measurement object can be determined by a measurement program. By way of example, a measurement program that can be converted into control commands for the apparatus controller can be provided for a measurement of the measurement object. The measurement program can be dependent on the measurement strategy, the measurement element and the test feature to be determined and/or to be tested.

The apparatus controller can comprise at least one data processing unit, for example at least one computer or microcontroller. The data processing unit can have one or more volatile and/or non-volatile data memories, wherein the data processing unit can be configured for example in terms of programming to control the optical sensor. The apparatus controller can furthermore comprise at least one interface, for example an electronic interface and/or a human-machine interface such as, for example, an input/output device such as a display and/or a keyboard. By way of example, one or more electronic connections between the optical sensor and the apparatus controller can be provided.

The term "display device" as used here is a broad term which is intended to be accorded its customary and familiar meaning as understood by a person skilled in the art. The term is not restricted to a specific or adapted meaning. The term can refer, without restriction, in particular to any device for optical visualization. The display device can comprise for example a display and/or a monitor and/or an augmented reality (AR) device and/or a virtual reality (VR) device.

The term "schematic representation" as used here is a broad term which is intended to be accorded its customary and familiar meaning as understood by a person skilled in the art. The term is not restricted to a specific or adapted meaning. The term can refer, without restriction, in particular to in principle any visualization of the image to be recorded. The schematic representation can be a representation of an image calculated, in particular by the data processing unit. The schematic representation can be for example a frame and/or a contour and/or outline of the image. The schematic representation can be such that the respective image recording position defines the center point of the schematic representation. The display device can be configured to display the schematic representation positionally correctly. "Positionally correctly" can be understood to mean that the schematic representation correctly represents position and orientation of the image to be recorded, in particular relative to a reference system and/or a reference element. The display device can be configured to display the schematic representation of the images to be recorded schematically with a representation of a measurement space and/or with a representation of the measurement object and/or with a representation of a measurement element. By way of example, the optical sensor and/or a further image sensor of the optical measuring device can be configured to record an overview image of the measurement space and/or of the measurement object. The display device can be configured to superimpose the schematic representation on the overview image. By way of example, a measurement task might consist in images of objects in the measurement space being intended to be produced, in particular for documentation purposes. The images can be produced at different image recording positions, which can be visualized by the display device as a schematic representation and can be manipulated by the user.

The term "data processing unit" as used here is a broad term which is intended to be accorded its customary and familiar meaning as understood by a person skilled in the art. The term is not restricted to a specific or adapted meaning. The term can refer, without restriction, in particular to an arbitrary logic circuit, for performing basic operations of a computer or system, and/or generally to a device configured to perform calculations or logic operations. The data processing unit can comprise a processor or a processor unit. The data processing unit can comprise at least one microprocessor. The data processing unit can have for example an arithmetic-logic unit (ALU), a floating-point unit (FPU), such as a mathematical coprocessor or numerical coprocessor, a plurality of registers and a main memory, for example a cache main memory. The data processing unit can comprise a multicore processor. The data processing unit can comprise a central processing unit (CPU). Alternatively or additionally, the data processing unit can comprise one or more application-specific integrated circuits and/or one or more field-programmable gate arrays (FPGAs) or the like.

The term "interface" as used here is a broad term which is intended to be accorded its customary and familiar meaning as understood by a person skilled in the art. The term is not restricted to a specific or adapted meaning. The term can refer, without restriction, in particular to an element or part of the optical measuring device that is configured to transmit information. The interface can be a communication interface, in particular a data interface, configured to receive data from another device and/or from a user and/or to communicate data from the interface to further components of the optical measuring device and/or to external devices. The interface can comprise at least one electronic interface and/or a human-machine interface such as for example an input/output device such as a display and/or a keyboard. The interface can comprise at least one data connection, for example a Bluetooth connection, an NFC connection or another connection. The interface can comprise at least one network or be part of a network. The interface can comprise at least one Internet port, at least one USB port, at least one drive or a web interface.

The term "manipulation" as used here is a broad term which is intended to be accorded its customary and familiar meaning as understood by a person skilled in the art. The term is not restricted to a specific or adapted meaning. The term can refer, without restriction, in particular to influencing, for example adapting and/or changing, the image recording position and/or at least one image recording parameter. The manipulation can be effected by the user. The term "manipulation information" as used here is a broad term which is intended to be accorded its customary and familiar meaning as understood by a person skilled in the art. The term is not restricted to a specific or adapted meaning. The term can refer, without restriction, in particular to information concerning the influencing of the image recording position and/or the image recording parameter. The manipulation information can comprise for example information about a size and/or scaling and/or translation and/or rotation and/or torsion of at least one image to be recorded. The manipulation information can comprise for example information about a change of an image recording position of at least one image to be recorded. The interface can be configured to give the user the opportunity to manipulate the schematic representations. The interface can be a human-machine interface. The manipulation information can be able to be input by a user via the interface.

The display device and/or the interface can be configured to display to the user and/or to make available to the user for selection possible manipulations, such as adapting the size and/or scaling and/or translation and/or rotation and/or torsion. All possible manipulations can be displayed and/or made available for selection. Alternatively, just one or a few manipulations can be offered. By way of example, it is possible for a manipulation of the zoom not to be displayed and/or made available for selection, even if the optical sensor supports this.

The optical measuring device can be configured to the effect that the image recording parameters and/or image recording positions can be manipulated only in a limited way. By way of example, the image recording position and/or the image recording parameter can be adaptable within a range predefined by a measurement strategy.

At least one of the schematically represented images can have a specific property. The data processing unit can be configured to the effect that if the user removes the image, the data processing unit passes on this property to another of the schematically represented images. By way of example, it may be necessary to set the correct recording distance before the measurement of a measurement element by means of autofocus. The autofocus is performed only at a location in the measurement strategy, for example usually in the center of the first image recording position. In the event of the image being removed, the autofocus can be carried out at a different position. Equally, for example, an automatic setting of the illumination can be carried out.

The data processing unit is configured to adapt the image recording position and/or at least one image recording parameter of at least one of the images to be recorded depending on the manipulation information. The term "adapting" as used here is a broad term which is intended to be accorded its customary and familiar meaning as understood by a person skilled in the art. The term is not restricted to a specific or adapted meaning. The term can refer, without restriction, in particular to a changing and/or setting and/or determining. Adapting the image recording position can comprise removing the image recording position or adding the image recording position and/or displacing the image recording position. The image recording positions and/or the image recording parameters of the images to be recorded which are represented schematically by the display device can be adapted individually. The image recording positions and/or the image recording parameters of at least two schematically represented images to be recorded can be adaptable. The respective image recording position and/or the respective image recording parameter of the images to be recorded can be adaptable individually and/or independently of one another. The image recording position and/or the image recording parameter of all schematically represented images to be recorded can be adaptable, in particular successively. The image recording position and/or the image recording parameter for at least one of the images to be recorded can be adaptable independently of the image recording positions and/or the image recording parameters of the other images. The optical measuring device can be configured to the effect that the image recording position and/or the image recording parameter of at least one of the images to be recorded is manipulation-protected. By way of example, the algorithm for determining the image recording positions could protect specific images or specific properties of individual images against alterations because they are absolutely necessary for a correct implementation of the chosen measurement strategy.

The display device and/or the interface can be configured to pass towards the outside information regarding which image recording position and/or which image recording parameter were/was altered, such that another part of the optical measuring device and/or of a coordinate measuring machine comprising the optical measuring device and/or of an industrial robot and/or of a microscope comprising the optical measuring device can account for this information. By way of example, during renewed execution of the algorithm for determining the image recording positions, in order to be able to implement the chosen measurement strategy, the altered image recording position and/or the altered image recording parameter could be left unaltered.

The display device can be configured to display a schematic representation of the images to be recorded with an adapted image recording position and/or an adapted image recording parameter. The display device can be configured to mark in each case the schematic representation of the images to be recorded with an adapted image recording position and/or an adapted image recording parameter. The display device can be configured to mark in a different way images to be recorded with overlapping image recording regions.

In one embodiment, the optical sensor can be a three-dimensional optical sensor and/or comprise at least one three-dimensional optical sensor. The schematic representation can comprise a representation of the entire recording region of the optical sensor in the 3D scene, for example a parallelepiped, in the case of a telecentric optical sensor, or a truncated pyramid in the case of a non-telecentric optical sensor. A side of this body that faces the optical sensor can be positioned at a minimum working distance and a side facing away can be positioned at the maximum working distance of the sensor. Alternatively or additionally, a simplification of the schematic representation can also comprise a representation corresponding to the case of a two-dimensional optical sensor. The schematic representation can be positioned at a specific point within the measurement range of the three-dimensional optical sensor, for example the average working distance or any other typical working distance.

In a further aspect, a device for dimensional measurement of a measurement object is proposed. The dimensional measurement can comprise a determination of at least one property of the measurement object and/or of a part of the measurement object, such as a measurement of diameter, length, distance, shape and position.

The device can be a coordinate measuring machine, an industrial robot or a microscope. The device comprises at least one optical measuring device according to the invention according to any of the preceding embodiments described or any further embodiment described below. For details and embodiments with regard to the device, reference is made to the description of the optical measuring device according to the invention.

The coordinate measuring machine can be a gantry-type measuring machine or a bridge-type measuring machine. The coordinate measuring machine can have a measuring table on which to place at least one object to be measured. The coordinate measuring machine can comprise at least one gantry which comprises at least one first vertical column, at least one second vertical column and a cross beam which connects the first vertical column and the second vertical column. At least one vertical column selected from the first and second vertical columns can be mounted so as to be movable on the measuring table. The horizontal direction can be a direction along a y-axis. The coordinate measuring machine can have a coordinate system, for example a Cartesian coordinate system or a spherical coordinate system. Other coordinate systems are also conceivable. An x-axis can run perpendicular to the y-axis in a plane of the bearing surface of the measuring table. A z-axis, also called longitudinal axis, can extend perpendicular to the plane of the bearing surface, in a vertical direction. The vertical columns can extend along the z-axis. The cross beam can extend along the x-axis. The coordinate measuring machine can have at least one measuring slide which is mounted so as to be movable along the cross beam. A measuring slide can be understood generally to mean a slide which is configured to accommodate at least one sensor device directly or via further components. In the measuring slide there can be mounted a sleeve which is movable in a vertical direction, for example along the z-axis. The optical sensor, for example, can be arranged at a lower end, in particular an end facing in the direction of the bearing surface, of the sleeve. The optical sensor can be exchanged for a tactile sensor for measurements in a different measuring mode. The sensors can be connected to the device in an interchangeable manner.

In the case of a configuration of the device as a microscope, the optical sensor can be configured as a microscope camera. The microscope camera can comprise at least one illumination device configured to generate an illumination light beam. The microscope camera can comprise at least one microscope optical unit configured to focus the illumination light beam and to generate at least one magnified image of the measurement object in at least one image plane. The microscope optical unit can comprise at least one lens element and/or a lens-element system and/or an objective lens, in particular a zoom objective lens. The microscope camera can be configured to record the magnified image.

In a further aspect, a method for creating a measurement program for determining at least one dimensional measurement of a measurement object with an optical sensor is proposed.

The method comprises the following steps:
a) providing a measurement strategy;
b) providing a plurality of predetermined and/or determinable image recording positions;
c) displaying in each case a schematic representation of an image to be recorded at the respective predetermined and/or determinable image recording position;
d) providing at least one item of manipulation information to a data processing unit via at least one interface;
e) adapting the image recording position and/or at least one image recording parameter of at least one of the images to be recorded depending on the manipulation information; and
f) creating the measurement program for recording images of the measurement object with the optical sensor using the adapted image recording position and/or the adapted image recording parameter.

An optical measuring device according to the invention can be used in the method. For details and embodiments with regard to the method, reference is made to the description of the optical measuring device according to the invention.

The method steps can be carried out in the order indicated, wherein one or more of the steps can at least in part also be carried out simultaneously and wherein one or more of the steps can be repeated multiply. Furthermore, further steps can additionally be performed independently of whether or not they are mentioned in the present application.

In a further aspect, a test method for determining at least one dimensional property of a measurement object is proposed. The method can be used not only during programming but also when carrying out a test sequence. The image recording positions can be displayed schematically to the user, for example prior to the measurement. The user can manipulate these positions as necessary and then start the measurement. These manipulations can either be stored for the following sequences or be discarded.

The method comprises the following steps:
I) providing a plurality of predetermined and/or determinable image recording positions;
II) displaying in each case a schematic representation of an image to be recorded at the respective predetermined and/or determinable image recording position;
III) providing at least one item of manipulation information to a data processing unit via at least one interface;
IV) adapting the image recording position and/or at least one image recording parameter of at least one of the images to be recorded depending on the manipulation information;
V) recording a plurality of images of the measurement object with at least one optical sensor taking account of the adapted image recording positions and/or the adapted image recording parameter.

An optical measuring device according to the invention can be used in the method. For details and embodiments with regard to the method, reference is made to the description of the optical measuring device according to the invention.

The method steps can be carried out in the order indicated, wherein one or more of the steps can at least in part also be carried out simultaneously and wherein one or more of the steps can be repeated multiply. Furthermore, further steps can additionally be performed independently of whether or not they are mentioned in the present application.

Furthermore, in the context of the present invention, a computer program is proposed which, when executed on a computer or a computer network, carries out at least one of the methods according to the invention in one of its configurations, in particular method steps a) to f) of the method for creating a measurement program for determining at least one dimensional measurement of a measurement object and/or method steps I) to V) of the test method.

Furthermore, in the context of the present invention, a computer program comprising program code means is proposed for carrying out the methods according to the invention in one of their configurations when the program is executed on a computer or computer network. In particular, the program code means can be stored on a computer-readable data medium.

The terms "computer-readable data medium" and "computer-readable storage medium" as used here can refer in particular to non-transitory data storage media, for example a hardware data storage medium on which computer-executable instructions are stored. The computer-readable data medium or the computer-readable storage medium can be or comprise, in particular, a storage medium such as a Random Access Memory (RAM) and/or a Read Only Memory (ROM).

Moreover, in the context of the present invention, a data medium is proposed on which is stored a data structure which, after being loaded into a random access memory and/or main memory of a computer or computer network, can carry out the methods according to the invention in one of their configurations.

Moreover, in the context of the present invention, a computer program product comprising program code means stored on a machine-readable carrier is proposed for carrying out the methods according to the invention in one of their configurations when the program is executed on a computer or computer network.

A computer program product is understood to mean the program as a tradable product. In principle, it can be available in any form, for example on paper or on a computer-readable data medium, and, in particular, it can be distributed via a data transmission network.

Finally, in the context of the present invention, a modulated data signal is proposed which contains instructions executable by a computer system or computer network for the purpose of carrying out a method according to any of the embodiments described.

With regard to the computer-implemented aspects of the invention, one, a plurality or even all of the method steps of the methods in accordance with one or more of the configurations proposed here can be carried out by means of a computer or computer network. Consequently, in general, any of the method steps, including the provision and/or manipulation of data, can be carried out by means of a computer or computer network. In general, these steps can comprise any of the method steps, excluding the steps that require manual work, for example the provision of workpieces and/or specific aspects of carrying out actual measurements.

The proposed devices and methods have numerous advantages over known devices and methods. In this regard, the proposed devices and methods can enable user-adaptable and thereby improved image recording. Further advantages may include making it possible to optimize overlaps of measurement images and thus to optimize the measurement strategy, either for the reduction of image recordings per se and thus for the reduction of measurement times or for the targeted increase of image recordings for the purpose of multiple coverage of specific regions of the measurement object. Furthermore, the user can obtain information about the imminent measurement time of the imminent measurement and/or about the imminent arising of the data volume of the measurement. Collision avoidance, particularly in difficult cases, e.g. when there is little space in the measurement region, can be possible.

In summary, in the context of the present invention, the following embodiments are particularly preferred:

Embodiment 1: Optical measuring device comprising:

at least one optical sensor configured for optical capture of at least one measurement object at a plurality of image recording positions;

at least one display device configured to display for a plurality of predetermined and/or determinable image recording positions in each case a schematic representation of an image to be recorded at the respective image recording position;

at least one data processing unit and at least one interface, wherein the interface is configured to provide at least one item of manipulation information to the data processing unit, wherein the data processing unit is configured to adapt the image recording position and/or at least one image recording parameter of at least one of the images to be recorded depending on the manipulation information.

Embodiment 2: Optical measuring device according to the preceding embodiment, wherein the image recording positions and/or the image recording parameters of at least two schematically represented images to be recorded are adaptable, wherein the respective image recording position and/or the respective image recording parameter of the images to be recorded is adaptable individually and/or independently of one another.

Embodiment 3: Optical measuring device according to any one of the preceding embodiments, wherein the image recording position and/or the image recording parameter of all the images to be recorded is adaptable.

Embodiment 4: Optical measuring device according to any one of the preceding embodiments, wherein the image recording position and/or the image recording parameter for at least one of the images to be recorded is adaptable independently of the image recording positions and/or the image recording parameters of the other images.

Embodiment 5: Optical measuring device according to any one of the preceding embodiments, wherein the optical measuring device is configured to the effect that the image recording position and/or the image recording parameter of at least one of the images to be recorded is manipulation-protected.

Embodiment 6: Optical measuring device according to any one of the preceding embodiments, wherein the interface is a human-machine interface, wherein the manipulation information is able to be input by a user via the interface.

Embodiment 7: Optical measuring device according to any one of the preceding embodiments, wherein adapting the image recording position comprises removing the image recording position or adding the image recording position and/or displacing the image recording position.

Embodiment 8: Optical measuring device according to any one of the preceding embodiments, wherein the image recording parameter comprises at least one parameter selected from the group consisting of: size, scaling, translation, rotation, torsion.

Embodiment 9: Optical measuring device according to the preceding embodiment, wherein the image recording parameter comprises at least one parameter of at least one setting such as an illumination control, for example of a bright field, dark field, transmitted-light and/or coaxial illumination, and/or of a camera such as, for example, exposure time and/or aperture setting.

Embodiment 10: Optical measuring device according to any one of the preceding embodiments, wherein the image recording position and/or the image recording parameter is adaptable within a range predefined by a measurement strategy.

Embodiment 11: Optical measuring device according to any one of the preceding embodiments, wherein the display device is configured to display a schematic representation of the images to be recorded with an adapted image recording position and/or an adapted image recording parameter.

Embodiment 12: Optical measuring device according to the preceding embodiment, wherein the display device is configured to mark in each case the schematic representation of the images to be recorded with an adapted image recording position and/or an adapted image recording parameter.

Embodiment 13: Optical measuring device according to any one of the preceding embodiments, wherein the display device is configured to mark in a different way images to be recorded with overlapping image recording regions.

Embodiment 14: Optical measuring device according to any one of the preceding embodiments, wherein at least one measurement strategy is determinable via the interface.

Embodiment 15: Optical measuring device according to the preceding embodiment, wherein the optical measuring device is configured to determine the image recording positions depending on the measurement strategy.

Embodiment 16: Optical measuring device according to any one of the preceding embodiments, wherein the image recording positions are able to be input via the interface.

Embodiment 17: Optical measuring device according to any one of the preceding embodiments, wherein the display device is configured to display the schematic representation of the images to be recorded schematically with a representation of a measurement space and/or with a representation of the measurement object and/or with a representation of a measurement element.

Embodiment 18: Optical measuring device according to any one of the preceding embodiments, wherein the optical sensor is a two- or three-dimensional optical sensor.

Embodiment 19: Optical measuring device according to any one of the preceding embodiments, wherein a relative position of the optical sensor and the measurement object is adjustable.

Embodiment 20: Device for dimensional measurement of a measurement object, wherein the device is a coordinate measuring machine, an industrial robot or a microscope, wherein the device comprises at least one optical measuring device according to any one of the preceding embodiments.

Embodiment 21: Method for creating a measurement program for determining at least one dimensional measurement of a measurement object with at least one optical sensor, wherein the comprises the following steps:

a) providing a measurement strategy;
b) providing a plurality of predetermined and/or determinable image recording positions;
c) displaying in each case a schematic representation of an image to be recorded at the respective predetermined and/or determinable image recording position;
d) providing at least one item of manipulation information to a data processing unit via at least one interface;
e) adapting the image recording position and/or at least one image recording parameter of at least one of the images to be recorded depending on the manipulation information;
f) creating the measurement program for recording images of the measurement object with the optical sensor using the adapted image recording position and/or the adapted image recording parameter.

Embodiment 22: Method according to the preceding embodiment, wherein an optical measuring device according to any one of the preceding embodiments relating to an optical measuring device is used in the method.

Embodiment 23: Test method for determining at least one dimensional property of a measurement object, wherein the method comprises the following steps:

I) providing a plurality of predetermined and/or determinable image recording positions;
II) displaying in each case a schematic representation of an image to be recorded at the respective predetermined and/or determinable image recording position;
III) providing at least one item of manipulation information to a data processing unit via at least one interface;
IV) adapting the image recording position and/or at least one image recording parameter of at least one of the images to be recorded depending on the manipulation information;
V) recording a plurality of images of the measurement object with at least one optical sensor taking account of the adapted image recording positions and/or the adapted image recording parameter.

Embodiment 24: Method according to the preceding embodiment, wherein an optical measuring device according to any one of the preceding embodiments relating to an optical measuring device is used in the method.

Embodiment 25: Computer program, wherein the computer program, when executed on a computer or computer network, carries out a method for creating a measurement program according to any one of the preceding embodiments relating to a method for creating a measurement program, in particular method steps a) to f) of the method, and/or a test method according to any of the preceding embodiments relating to a test method, in particular method steps I) to V) of the test method.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Further details and features will become apparent from the following description of example embodiments, in particular in conjunction with the dependent claims. In this case, the respective features can be realized by themselves or as a plurality in combination with one another. The invention is not restricted to the example embodiments. The example embodiments are illustrated schematically in the figures. Identical reference numerals in the individual figures denote identical or functionally identical elements or elements corresponding to one another with regard to their functions.

DETAILED DESCRIPTION

Figure 1:
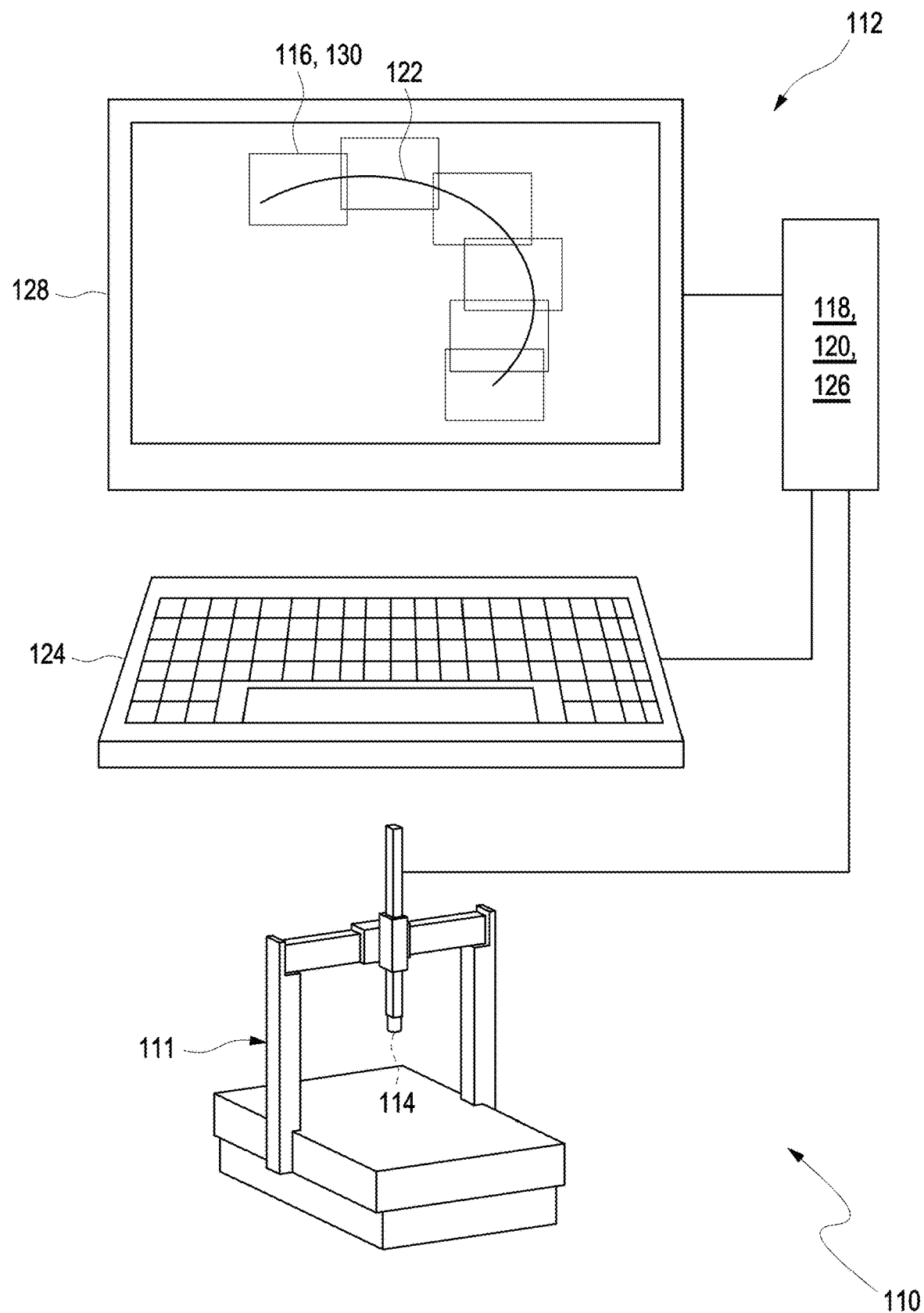
FIG. 1 is a schematic illustration of a device according to the invention for dimensional measurement of a measurement object with an optical measuring device according to the principles of the present disclosure.

FIG. 1 shows a schematic illustration of one embodiment of a device 110 according to the invention for dimensional measurement of a measurement object with an optical measuring device 112 according to the invention. The device 110 can be a coordinate measuring machine 111, as shown in FIG. 1, an industrial robot or a microscope.

The coordinate measuring machine 111 can be a gantry-type measuring machine or a bridge-type measuring machine. The coordinate measuring machine 111 can have a measuring table on which to place at least one object to be measured. The coordinate measuring machine 111 can have at least one gantry which has at least one first vertical column, at least one second vertical column and a cross beam which connects the first vertical column and the second vertical column. The vertical columns can be mounted moveably on the measuring table or be mounted moveably by means of connected guides.

The measurement object can be an arbitrarily shaped object to be measured. By way of example, the measurement object can be selected from the group consisting of a test object, a workpiece, and a component to be measured. By way of example, the measurement object can be a planar measurement object, for example having an extensive surface.

The optical measuring device 112 comprises at least one optical sensor 114 configured for optical capture of at least one measurement object at a plurality of image recording positions 116. The image recording position 116 can be a position of the optical sensor 114 at the time of image recording. The position can comprise a spatial position, in particular a three-dimensional point (x, y, z) in a coordinate system, and/or an orientation of the optical sensor 114. The orientation can be specified by at least three angles, for example an Euler angle or inclination angle, a roll angle and a yaw angle.

The optical sensor 114 can be configured to generate an imaging, also called image, of a measurement object. The optical sensor 114 can be a two- or three-dimensional optical sensor. By way of example, the optical sensor 114 can be a two-dimensional image sensor. The optical sensor 114 can comprise at least one camera sensor, for example at least one CCD camera.

The optical measuring device 112 can comprise at least one evaluation unit 118 configured to evaluate the recorded image. The evaluation 118 can comprise determining a position of at least one measurement point relative to a reference coordinate system. The evaluation unit 118 can be part of a data processing unit 120 of the optical measuring device 112. The data processing unit 120 can have one or more volatile and/or non-volatile data memories, wherein the data processing unit 120 can be configured for example in terms of programming to evaluate the image. The data processing unit 120 can comprise a processor or a processor unit, for example at least one microprocessor. The evaluation unit 118 can furthermore comprise at least one interface, for example an electronic interface and/or a human-machine interface such as, for example, an input/output device such as a display and/or a keyboard. By way of example, one or more electronic connections between the optical sensor 114 and the evaluation unit 118 can be provided.

The optical measuring device 112 can be configured to determine and/or to check at least one test feature of the measurement object. The test feature can be and/or comprise a feature that is to be determined and/or to be checked and/or to be tested of at least one measurement element 122. Determining and/or checking can comprise determining and/or checking dimensional deviations and/or shape deviations and/or positional deviations. The test feature can be a feature selected from the group consisting of: at least one length; at least one angular dimension, at least one surface parameter, a shape, a position. The measurement element 122 can be a predetermined or predeterminable geometric element. The measurement element 122 can be for example a geometric element selected from the group consisting of a circle, a cylinder, a rectangle, a straight line or another element with a regular geometry. The test feature can be determined and/or checked for example by measuring points and/or lines and/or areas of the measurement object. The optical measuring device 112 can be configured to record a plurality of images at different image recording positions 116 for the purpose of determining and/or checking the test feature. The recorded images can be evaluated by the evaluation unit 118 and in each case at least one measurement point can be determined.

The test feature can be determined and/or checked using a measurement strategy. The measurement strategy comprises at least one capture strategy which determines the image recording, in particular image recording positions 116.

The measurement strategy can be defined by a user of the optical measuring device 112. The optical measuring device 112 comprises at least one interface 124. The measurement strategy can be determinable via the interface 124. By way of example, the interface 124 can be a human-machine interface and the measurement strategy can be determined via the human-machine interface. Prior to the measurement the user can determine a measurement element 122, for example by selecting a measurement element 112 from a database, and define the measurement strategy.

The optical measuring device 112 can be configured to determine the image recording positions 116 depending on the measurement strategy. The image recording position 116 can be an image recording position that is preprogramed for a chosen measurement strategy. The optical measuring device 112, in particular the data processing unit 120 or a further processor of the optical measuring device 112, can be configured to execute an algorithm for determining the image recording positions 116 in order to be able to implement the chosen measurement strategy. Alternatively, the optical measuring device 112 can be configured to the effect that the user himself/herself can choose the image recording positions 116. The image recording positions 116 can be able to be input via the interface 124.

A relative position of the optical sensor 114 and of the measurement object can be adjustable. By way of example, a multiplicity of relative positions of the optical sensor 114 and of the measurement object can be adjustable for the purpose of recording the plurality of measurement points. By way of example, the optical sensor 114 can be moveable, for example in at least three spatial directions. By way of example, the optical sensor 114 can be displaceable and the measurement object can lie on a fixed or moveable support. Embodiments with a fixed optical sensor 114 are also conceivable, wherein the measurement object can then be displaced in these embodiments.

A relative movement of optical sensor 114 and measurement object can be controlled by an apparatus controller 126 of the optical measuring device 112 and/or an external apparatus controller. The relative movement of optical sensor 114 and measurement object can be determined by a measurement program. By way of example, a measurement program that can be converted into control commands for the apparatus controller 126 can be provided for a measurement of the measurement object. The measurement program can be dependent on the measurement strategy, the measurement element and the test feature to be determined and/or to be tested. The apparatus controller can be part of the data processing unit 120.

The optical measuring device 112 comprises at least one display device 128 configured to display for a plurality of predetermined and/or determinable image recording positions 116 in each case a schematic representation 130 of an image to be recorded at the respective image recording position 116. The display device 128 can be an arbitrary device for optical visualization. The display device 128 can comprise for example a display and/or a monitor and/or an augmented reality (AR) device and/or a virtual reality (VR) device.

The schematic representation 130 can be a representation of an image calculated, in particular by the data processing unit. The schematic representation 130 can be for example a frame and/or a contour and/or outline of the image. The schematic representation 130 can be such that the respective image recording position 116 defines the center point of the schematic representation 130. The display device 128 can be configured to display the schematic representation 130 positionally correctly. The display device 128 can be configured to display the schematic representation 130 of the images to be recorded schematically with a representation of a measurement space and/or with a representation of the measurement object and/or, as shown in FIG. 1, with a representation of a measurement element 122. By way of example, the optical sensor 114 and/or a further image sensor of the optical measuring device 112 can be configured to record an overview image of the measurement space and/or of the measurement object. The display device 128 can be configured to superimpose the schematic representation 130 on the overview image. By way of example, a measurement task might consist in images of objects in the measurement space being intended to be produced, in particular for documentation purposes. The images can be produced at different image recording positions 116, which can be visualized by the display device 128 as a schematic representation 130 and can be manipulated by the user.

The optical measuring device 112 comprises at least one data processing unit 120 and the at least one interface 124. The interface 124 is configured to provide at least one item of manipulation information to the data processing unit 120. The data processing unit 120 is configured to adapt the image recording position and/or at least one image recording parameter of at least one of the images to be recorded depending on the manipulation information.

The data processing unit 120 can comprise a processor or a processor unit. The data processing unit 120 can comprise for example an arithmetic-logic unit (ALU), a floating-point unit (FPU), such as a mathematical coprocessor or numerical coprocessor, a plurality of registers and a main memory, for example a cache main memory. The data processing unit 120 can comprise a multicore processor. The data processing unit 120 can comprise a central processing unit (CPU). Alternatively or additionally, the data processing unit 120 can comprise one or more application-specific integrated circuits and/or one or more field-programmable gate arrays (FPGAs) or the like.

The interface 124 can be a communication interface, in particular a data interface, configured to receive data from another device and/or from a user and/or to communicate data from the interface 124 to further components of the optical measuring device 112 and/or to external devices. The interface 124 can comprise at least one electronic interface and/or a human-machine interface such as for example an input/output device such as a display and/or a keyboard. The interface can have at least one data connection, for example a Bluetooth connection, an NFC connection or another connection. The interface 124 can have at least one network or be part of a network. The interface 124 can have at least one Internet port, at least one USB port, at least one drive or a web interface.

The manipulation of the schematic representation 120 can comprise influencing, for example adapting and/or changing, the image recording position 116 and/or at least one image recording parameter. Manipulation can be effected by the user. The image recording parameter can be an arbitrary property and/or a feature of the image and/or a setting of the optical sensor 114 and/or of a further component of the optical measuring device 112, such as a lens. The image recording parameter can comprise at least one parameter selected from the group consisting of: size, scaling, translation, rotation, torsion. Such parameters can be determined by settings of the optical sensor 114 and/or of a further component of the optical measuring device 112, such as a lens, for example a zoom setting. The image recording parameter can comprise at least one parameter of at least one setting such as an illumination control, for example of a bright field, dark field, transmitted-light and/or coaxial illumination, and/or of a camera such as, for example, exposure time and/or aperture setting. The image recording parameters can also comprise settings of further constituent parts, connected to a control unit, for example of the coordinate measuring machine 111, such as, for example, an illumination control, for example bright field, dark field, transmitted-light and/or coaxial illumination, and camera parameters such as, for example, exposure time and aperture setting.

The manipulation information can comprise information concerning the influencing of the image recording position and/or of the image recording parameter. The manipulation information can comprise for example information about a size and/or scaling and/or translation and/or rotation and/or torsion of at least one image to be recorded. The manipulation information can comprise for example information about a change of an image recording position 116 of at least one image to be recorded. The interface 124 can be configured to give the user the opportunity to manipulate the schematic representations. The interface 124 can be a human-machine interface. The manipulation information can be able to be input by a user via the interface 124.

The display device 128 and/or the interface 124 can be configured to display to the user and/or to make available to the user for selection possible manipulations, such as adapting the size and/or scaling and/or translation and/or rotation and/or torsion. All possible manipulations can be displayed and/or made available for selection. Alternatively, just one or a few manipulations can be offered. By way of example, it is possible for a manipulation of the zoom not to be displayed and/or made available for selection, even if the optical sensor 114 supports this.

The optical measuring device 112 can be configured to the effect that the image recording parameters and/or image recording positions 116 can be manipulated only in a limited way. By way of example, the image recording position 116 and/or the image recording parameter can be adaptable within a range predefined by a measurement strategy.

At least one of the schematically represented images can have a specific property. By way of example, it may be necessary to set the correct recording distance before the measurement of a measurement element 122 by means of autofocus. The autofocus is performed only at a location in the measurement strategy, for example usually in the center of the first image recording position. In the event of the image being removed, the autofocus can be carried out at a different position. Equally, for example, an automatic setting of the illumination can be carried out. The data processing unit 120 can be configured to the effect that if the user removes the image, the data processing unit passes on this property to another of the schematically represented images.

The data processing unit 120 is configured to adapt the image recording position and/or at least one image recording parameter of at least one of the images to be recorded depending on the manipulation information. Adapting the image recording position 116 can comprise removing the image recording position 116 or adding the image recording position 116 and/or displacing the image recording position 116. The image recording positions 116 and/or the image recording parameters of the images to be recorded which are represented schematically by the display device 128 can be adapted individually. The image recording positions 116 and/or the image recording parameters of at least two schematically represented images to be recorded can be adaptable. The respective image recording position 116 and/or the respective image recording parameter of the images to be recorded can be adaptable individually and/or independently of one another. The image recording position 116 and/or the image recording parameter of all schematically represented images to be recorded can be adaptable, in particular successively. The image recording position 116 and/or the image recording parameter for at least one of the images to be recorded can be adaptable independently of the image recording positions 116 and/or the image recording parameters of the other images. The optical measuring device 112 can be configured to the effect that the image recording position 116 and/or the image recording parameter of at least one of the images to be recorded is manipulation-protected. By way of example, the algorithm for determining the image recording positions 116 could protect specific images or specific properties of individual images against alterations because they are absolutely necessary for a correct implementation of the chosen measurement strategy.

The display device 128 and/or the interface 124 can be configured to pass towards the outside information regarding which image recording position 116 and/or which image recording parameter were/was altered, such that another part of the optical measuring device 112 and/or of the device 110 comprising the optical measuring device 112 can account for this information. By way of example, during renewed execution of the algorithm for determining the image recording positions 116, in order to be able to implement the chosen measurement strategy, the altered image recording position 116 and/or the altered image recording parameter could be left unaltered.

The display device 128 can be configured to display a schematic representation 130 of the images to be recorded with an adapted image recording position and/or an adapted image recording parameter. The display device 128 can be configured to mark in each case the schematic representation of the images to be recorded with an adapted image recording position and/or an adapted image recording parameter. The display device 128 can be configured to mark in different way images to be recorded with overlapping image recording regions.

Figure 2:
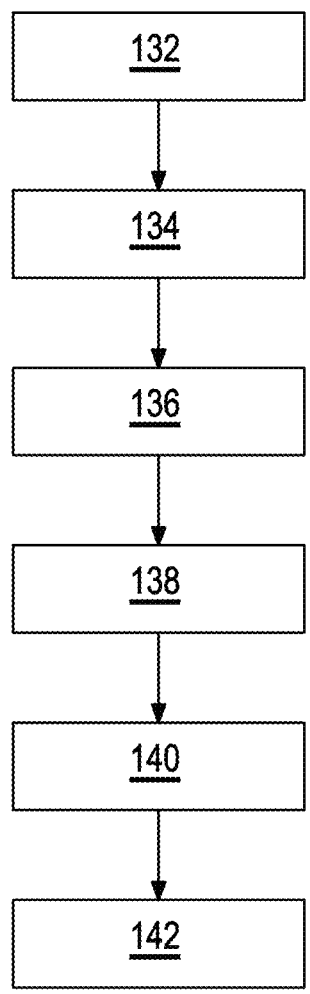
FIG. 2 is a flow diagram of a method for creating a measurement program for determining at least one dimensional measurement of a measurement object with at least one optical sensor.

FIG. 2 shows a flow diagram of a method for creating a measurement program for determining at least one dimensional measurement of a measurement object with the optical sensor 114. The method comprises the following steps:

a) (reference numeral 132) providing a measurement strategy;

b) (reference numeral 134) providing a plurality of predetermined and/or determinable image recording positions 116;

c) (reference numeral 136) displaying in each case a schematic representation 130 of an image to be recorded at the respective predetermined and/or determinable image recording position 116;

d) (reference numeral 138) providing at least one item of manipulation information to the data processing unit 120 via the at least one interface 124;

e) (reference numeral 140) adapting the image recording position 116 and/or at least one image recording parameter of at least one of the images to be recorded depending on the manipulation information;

f) (reference numeral 142) creating the measurement program for recording images of the measurement object with the optical sensor 114 using the adapted image recording position and/or the adapted image recording parameter.

An optical measuring device 112 according to the invention can be used in the method. For details and embodiments with regard to the method, reference is made to the description of the optical measuring device 112 according to the invention in FIG. 1.

In the drawings, reference numbers may be reused to identify similar and/or identical elements.

110 Device
111 Coordinate measuring machine
112 Optical measuring device
114 Optical sensor
116 Image recording positions
118 Evaluation unit
120 Data processing unit
122 Measurement element
124 Interface
126 Apparatus controller
128 Display device
130 Schematic representation of the image recording position 116
132 Method step a)
134 Method step b)
136 Method step c)
138 Method step d)
140 Method step e)
142 Method step f)

What is claimed is:

1. An optical measuring device comprising:
  at least one optical sensor configured for optical capture of at least one measurement object at a plurality of image recording positions;
  at least one display device configured to display for a plurality of predetermined and/or determinable image recording positions in each case a schematic representation of an image to be recorded at the respective image recording position; and at least one data processing unit and at least one interface, wherein:

the interface is configured to provide at least one item of manipulation information to the data processing unit, and the data processing unit is configured to, based on the manipulation information, adapt at least one of the image recording position and an image recording parameter of at least one of the images to be recorded.

2. The optical measuring device of claim 1 wherein:

the image recording positions and/or the image recording parameters of at least two schematically represented images to be recorded are adaptable; and the respective image recording position and/or the respective image recording parameter of the images to be recorded is adaptable individually and/or independently of one another.

3. The optical measuring device of claim 1 wherein the optical measuring device is configured such that the image recording position and/or the image recording parameter of at least one of the images to be recorded is manipulation-protected.

4. The optical measuring device of claim 1 wherein:

the interface is a human-machine interface; and the interface is configured to receive the manipulation information from a user.

5. The optical measuring device of claim 1 wherein the image recording parameter comprises a parameter selected from the group consisting of size, scaling, translation, rotation, and torsion.

6. The optical measuring device of claim 1 wherein the image recording parameter comprises an illumination control parameter.

7. The optical measuring device of claim 6 wherein values for the illumination control parameter specify, respectively, a bright field, a dark field, transmitted-light, and coaxial illumination.

8. The optical measuring device of claim 1 wherein the image recording parameter comprises a camera parameter.

9. The optical measuring device of claim 8 wherein the camera parameter specifies at least one of exposure time and aperture.

10. The optical measuring device of claim 1 wherein the display device is configured to display a schematic representation of the images to be recorded with an adapted image recording position and/or an adapted image recording parameter.

11. The optical measuring device of claim 1 wherein the display device is configured to mark in each case the schematic representation of the images to be recorded with an adapted image recording position and/or an adapted image recording parameter.

12. The optical measuring device of claim 1 wherein a measurement strategy is determinable via the interface.

13. The optical measuring device of claim 12 wherein the optical measuring device is configured to determine the image recording positions depending on the measurement strategy.

14. The optical measuring device of claim 1 wherein the image recording positions are able to be input via the interface.

15. The optical measuring device of claim 1 wherein the display device is configured to display the schematic representation of the images to be recorded schematically with at least one of:

a representation of a measurement space;

a representation of the measurement object; and a representation of a measurement element.

16. A device for dimensional measurement of a measurement object, the device comprising:

the optical measuring device of claim 1, wherein the device is at least one of a coordinate measuring machine, an industrial robot, and a microscope.

17. A method for creating a measurement program for determining at least one dimensional measurement of a measurement object with at least one optical sensor, the method comprising:

providing a measurement strategy;

providing a plurality of predetermined and/or determinable image recording positions;

displaying in each case a schematic representation of an image to be recorded at the respective predetermined and/or determinable image recording position;

providing at least one item of manipulation information to a data processing unit via at least one interface;

based on the manipulation information, adapting the image recording position and/or at least one image recording parameter of at least one of the images to be recorded; and creating the measurement program for recording images of the measurement object with the optical sensor using the adapted image recording position and/or the adapted image recording parameter.

18. A test method for determining at least one dimensional property of a measurement object, the method comprising:

providing a plurality of predefined and/or predeterminable image recording positions;

displaying in each case a schematic representation of an image to be recorded at the respective predetermined and/or predeterminable image recording position;

providing at least one item of manipulation information to a data processing unit via at least one interface;

based on the manipulation information, adapting the image recording position and/or at least one image recording parameter of at least one of the images to be recorded; and recording a plurality of images of the measurement object with at least one optical sensor taking account of the adapted image recording positions and/or the adapted image recording parameter.

* * * * *